(12) United States Patent
Georgeau et al.

(10) Patent No.: US 7,767,308 B2
(45) Date of Patent: Aug. 3, 2010

(54) MOISTURE-CURABLE ADHESIVE COMPOSITION

(75) Inventors: Philip C. Georgeau, Kalamazoo, MI (US); Jonathan H. Ballema, Kalamazoo, MI (US)

(73) Assignee: Chem Link, Inc., Schoolcraft, MI (US)

( * ) Notice: Subject to any disclaimer, the term of this patent is extended or adjusted under 35 U.S.C. 154(b) by 680 days.

(21) Appl. No.: 11/581,714

(22) Filed: Oct. 16, 2006

(65) Prior Publication Data

US 2007/0088137 A1    Apr. 19, 2007

Related U.S. Application Data

(60) Provisional application No. 60/727,032, filed on Oct. 14, 2005.

(51) Int. Cl.
*B32B 9/04*    (2006.01)
(52) U.S. Cl. ........................ 428/447; 525/393; 525/395; 428/423.1; 428/424.8; 428/448; 428/524
(58) Field of Classification Search ........................ None
See application file for complete search history.

(56) References Cited

U.S. PATENT DOCUMENTS

| | | | |
|---|---|---|---|
| 4,413,086 A | 11/1983 | Chang et al. | |
| 4,588,637 A | 5/1986 | Chiu | |
| 4,593,068 A * | 6/1986 | Hirose et al. | 525/100 |
| 4,631,322 A | 12/1986 | Isayama et al. | |
| 4,707,526 A * | 11/1987 | Sasaki et al. | 525/404 |
| 5,097,053 A | 3/1992 | Baghdachi et al. | |
| 5,227,434 A | 7/1993 | Katz | |
| 5,298,572 A | 3/1994 | Katz | |
| 5,760,155 A | 6/1998 | Mowrer et al. | |
| 6,121,354 A * | 9/2000 | Chronister | 524/262 |
| 7,452,930 B2 * | 11/2008 | Kawakami et al. | 524/70 |
| 2003/0130411 A1 * | 7/2003 | Ishikawa et al. | 524/588 |
| 2005/0166783 A1 * | 8/2005 | Ylitalo et al. | 101/494 |
| 2008/0058492 A1 * | 3/2008 | Griswold | 528/60 |

FOREIGN PATENT DOCUMENTS

| | | | |
|---|---|---|---|
| JP | 2-132174 A  * | 5/1990 | |
| WO | WO00/37534 | 6/2000 | |

* cited by examiner

*Primary Examiner*—Marc S Zimmer
(74) *Attorney, Agent, or Firm*—Price, Heneveld, Cooper, DeWitt & Litton, LLP

(57) ABSTRACT

A moisture-curable adhesive composition that may be formulated to be free of volatile organic compounds, or substantially free of volatile organic compounds which is safe for chronic exposure, resistant to combustion, and provides a high peel strength useful for securing a rubber membrane material to a rigid roof deck includes a polymer having silicon-containing hydrolyzable terminal groups, a phenolic resin, and a non-polymeric silicon-containing hydrolyzable compound, wherein the ratio of the amount of polymer having silicon-containing hydrolyzable terminal groups by weight to the amount of phenolic resin by weight is greater than 2:1.

23 Claims, 1 Drawing Sheet

MOISTURE-CURABLE ADHESIVE COMPOSITION

CROSS-REFERENCE TO RELATED APPLICATION

This application claims priority under 35 U.S.C. §119(e) on U.S. Provisional Application No. 60/727,032 entitled SOLVENT-FREE SINGLE-PLY RUBBER MEMBRANE ADHESIVE, filed Oct. 14, 2005, the entire disclosure of which is incorporated herein by reference.

FIELD OF THE INVENTION

This invention relates to adhesive compositions, and more particularly to moisture-curable adhesive compositions that are capable of bonding tenaciously with rubber materials.

BACKGROUND OF THE INVENTION

Single-ply rubber membrane sheet materials are used for covering industrial and commercial flat or low slope roofs. The oldest and most effective means of securing single-ply rubber membranes to roof decks has been with solvent-based, contact-bond adhesives.

Other methods of membrane attachment include ballast stone and mechanical termination bars installed at lap areas under the outer edge of rubber sheets. Over a period of time, ballast stones damage rubber membranes. A ballast stone system has several other disadvantages. Over time, ballast stones also accumulate dirt and air-borne pollution that can further accelerate membrane damage. Also, ballast stones have been known to consolidate at certain areas on the roof leaving other areas bare. Furthermore, severe weather conditions can cause the ballast stones to become dangerous projectiles. In fact, housing codes have outlawed the use of ballast stones in some areas where severe weather, such as hurricanes, is likely to occur.

In a termination bar system, the termination bars secure the periphery of the rubber membrane and allow the membrane to repeatedly inflate upwardly when winds create a negative draft over the roof surface. The width of rubber roof membranes has recently increased from six feet to as much as twelve feet. Wider membrane sheets inflate more over a larger area thereby applying greater stress on the screws holding termination bars. With such increased wind uplift stress, failures in mechanically fastened roofs have likewise increased.

Fully adhered membrane systems use "solvent release" contact-bond adhesives that typically contain 80% volatile organic solvent. The solvents used are typically blends of toluene, xylene and hexane with small amounts of acetone. These solvents are extremely flammable and both hexane and toluene are toxic and carcinogenic with chronic exposure. Additionally, toluene and xylene polymerize in the atmosphere to form particulate air pollution.

Solvent release adhesives are difficult to spray effectively. In dry weather conditions, there is a risk of fire initiated by static electricity. In damp weather conditions atmospheric moisture is often caught up in a spray pattern resulting in water contamination known as "blush" at the bond interface. Such moisture trapped within the bond greatly diminishes bond strength.

Problems with spray application have forced the industry to rely on brush or roll coater application. These application methods have proven to be wasteful, less efficient and more labor intensive. Particularly problematic is the fact that conventional contact-bond adhesives must be applied to both opposing bond surfaces. When contact-bond adhesives are applied to both rubber membrane and roof deck surfaces they must be left open to the air for about fifteen minutes to allow the solvent to evaporate into the atmosphere before making a bond.

After the solvent is allowed to evaporate, the opposing coated surfaces are then carefully assembled, avoiding misalignment. An aggressive bond is formed with even light contact of one coated surface with the other. Misaligned bonds cause wrinkles or blisters that cannot be eliminated without damage to construction materials. The assembled sheets are then rolled or brushed, such as with push brooms, to set the bond over the entire membrane surface.

Because of the required application of adhesive to both surfaces, coverage is usually about fifty square feet of membrane to the gallon. More than a billion square feet of single-ply roofing is installed each year. The single-ply roofing industry annually applies more than 1,500,000 gallons of flammable, solvent-based contact adhesive. Eighty percent of this material is released into the atmosphere each year. This practice results in a chronic health risk for thousands roofing workers, a serious atmospheric insult, and a waste of petroleum resources.

Properly installed, fully adhered membrane systems still provide the most durable means of attachment for single-ply roofing. However, the costs associated with such systems, along with greater air-quality restrictions and worker safety concerns have pushed the industry toward more cost effective, safer and less environmentally contentious methods of attachment.

It is often assumed by roofing professionals, and others, that safe, environmentally compliant products are inherently more expensive and inferior in performance to solvent-based products. This invention shall demonstrate that solvent free products can be economically competitive and superior in performance to dangerous, flammable solvent-based materials.

SUMMARY OF THE INVENTION

The invention provides an improved moisture-curable liquid adhesive composition that may be formulated to be free of volatile organic compounds (VOCs), safe for chronic exposure, and non-flammable. In addition, the adhesive compositions of this invention can be formulated to provide a high initial peel strength and/or high peel strength upon being fully cured between a roof substrate and a rubber membrane roofing material and/or between overlapping sheets of rubber membrane materials.

The adhesive compositions of this invention include a polymer having silicon-containing hydrolyzable terminal groups, a phenolic resin, and a non-polymeric silicon-containing hydrolyzable compound, wherein the ratio of the amount of polymer having silicon-containing hydrolyzable terminal groups by weight to the amount of phenolic resin by weight is greater than 2:1.

These and other features, advantages and objects of the present invention will be further understood and appreciated by those skilled in the art by reference to the following specification, claims and appended drawing.

DETAILED DESCRIPTION OF PREFERRED EMBODIMENTS

Figure 1:
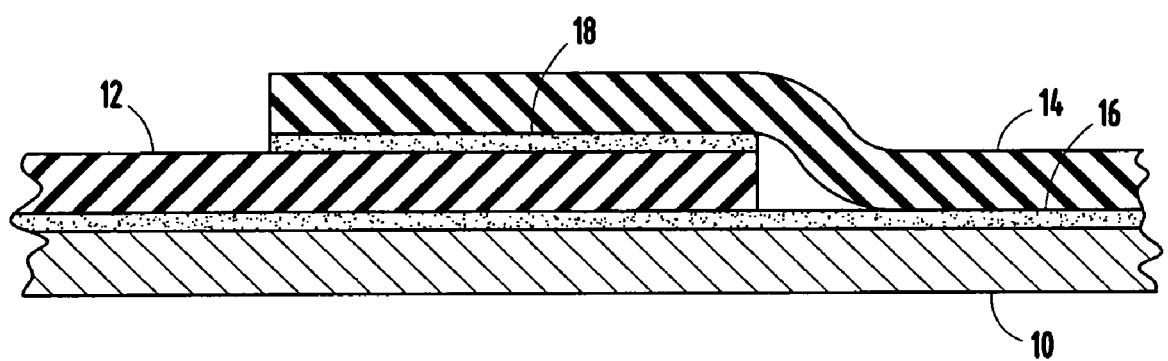
FIG. 1 shows sheets of rubber membrane material adhered to a roof substrate using an adhesive composition in accordance with the invention.

The adhesive compositions in accordance with this invention comprise a polymer or a combination of polymers having silicon-containing hydrolyzable terminal groups, a phenolic resin, and a non-polymeric silicon-containing hydrolyzable compound. These adhesive compositions have a ratio of the amount of polymer having silicon-containing hydrolyzable terminal groups by weight to the amount of phenolic resin by weight that is greater than 2:1. Surprisingly, these compositions are capable of achieving a peel strength between a rubber membrane and a roof substrate that equals or exceeds the peel strength of conventional solvent-based neoprene and nitrile contact-bond adhesives, while eliminating or at least substantially reducing the need for volatile organic solvents. Solvent-free and substantially solvent-free adhesive compositions (i.e., containing minor amounts of VOCs that do not present a significant environmental burden, health risk or fire hazard, ranging from incidental impurities up to about 1% by weight of the composition) in accordance with the invention are safe for chronic exposure and are relatively resistant to combustion as compared with conventional solvent-based adhesive compositions. Solvent-free and/or substantially solvent-free compositions that do not release toxic and/or noxious fumes, volatile organic compounds, or explosive and/or highly flammable compounds during spraying or brushing of the adhesive composition in an open atmosphere can be formulated in accordance with an aspect of this invention.

In addition, or alternatively, the adhesive compositions of the invention may also be formulated to be free or substantially free of solids such as fillers and/or pigments (i.e., containing relatively minor amounts of solid particulate materials prior to gelling and curing, which do not detrimentally interfere with sprayability, ranging from incidental impurities up to about 1% by weight of the composition), and have a relatively low viscosity (e.g., less than 10,000 centipoise, more preferably less than 5,000 centipoise, and more typically about 3,500 centipoise or less as determined at room temperature using a Brookfield Viscometer, Spindle No. 2 at 30 rpm). The combination of low or no VOCs, and relatively low viscosity makes the adhesive compositions of the invention sprayable. This is a distinct advantage over conventional adhesives that must be applied by roller or brush in order to avoid and/or minimize solvent release and the risk of fire. In addition, or alternatively, the compositions of the invention may be applied to only one surface to achieve good adhesion between two surfaces. Thus, rather than applying the adhesive composition to both the roof substrate and one side of a rubber membrane material, it is only necessary to apply a composition in accordance with the invention to one of the two surfaces to be bonded in order to achieve suitable adhesion and peel strength. Sprayability, the ability to apply the adhesive to only one of two surfaces that are to be adhered together, and especially both of these features in combination substantially reduce labor costs associated with adhering a rubber membrane material to a roof substrate, making it a practical and desirable alternative to methods that do not involve use of a contact adhesive.

While in accordance with certain embodiments of the invention, the adhesive compositions are free or substantially free of fillers or pigments, the adhesive compositions of the invention could also be formulated to contain various fillers, pigments, and other solid materials as a means to adjust physical and mechanical properties.

In addition to the polymer having silicon-containing hydrolyzable terminal groups, the phenolic resin, and the non-polymeric silicon-containing hydrolyzable compound, it may be desirable to incorporate various other materials in relatively small amounts. For example, in certain embodiments it is desirable to incorporate a plasticizer in the adhesive composition in order to modify and/or improve physical properties such as elasticity of the adhesive composition after it has cured. A plasticizer may also be incorporated to act as a non-volatile organic solvent for the polymer(s) and/or phenolic resin. Further, it may be desirable to incorporate a second tackifier that is not a phenolic resin, such as an aliphatic and/or aromatic hydrocarbon resin, terpene resin, or natural rubber as a means to enhance wetting and transfer to an uncoated rubber substrate.

Although the compositions of this invention may be prepared in a moisture-free environment (e.g., with the use of dehumidified air, vacuum, and/or heat) and sealed in containers in a low humidity environment, thereby potentially eliminating the need for moisture scavengers, it is typically more practical and economical to prepare and package the adhesive compositions of this invention under less stringent conditions by employing a moisture scavenger.

Depending upon the polymer or polymers having silicon-containing hydrolyzable terminal groups that are selected for the compositions, it may be desirable to employ a catalyst or catalysts that promote hydrolysis and condensation reactions that will cause the polymer or polymers having silicon-containing hydrolyzable terminal groups to react with each other to form a cross-linked network (i.e., a cured or thermoset composition) upon exposure to moisture (water).

Various other ingredients may be employed in conventional and effective amounts, such as thixotropic agents, antioxidants, etc.

In accordance with certain aspects of the invention, compositions comprising several polymeric and chemical substances undergo a specific sequence of chemical reactions and physical changes that result in strong and durable bonds between certain roof membranes and corresponding rigid construction materials. These adhesive compositions can be roller applied or sprayed with airless or conventional spray systems. The adhesive preferably contains no volatile organic solvents or reactive isocyanates, and preferably contains no solvents or is substantially free of solvents, and therefore heavy, respiratory, skin and eye protection are not required. When spraying, only eye protection and a dust mask are required as protection from air-borne particles.

With either application method, atmospheric moisture initiates and sustains a series of chemical reactions that proceed in hierarchical fashion until all the bond mechanisms are completed. Upon application, a first reaction may involve a fast reacting alpha alkoxy silane carbamate terminated polymer that preferentially reacts with similar molecules to form a gelatinous film. The gelatinous film structure can be formed in as little as three minutes at room temperature.

This film develops a tacky surface property that is brought about by the interaction of a secondary tackifying polymer, a phenolic resin, a plasticizer and unreacted polyether polymers compounded within the formulation. The tackified film is capable of wetting and bonding an uncoated surface by simply pressing it into the gelatinous film surface with light pressure. The tacky wetting properties of the film will remain active for up to forty minutes before a second stage of polymerization further solidifies the film.

Another class of polymerization that may be employed involves a slower reacting gamma alkoxy silane carbamate terminated polyether, a SPUR polymer, or a silyl-terminated polyether. This reaction is controlled and driven by an organo-metalic tin catalyst and an amine accelerator. Assembly of the membrane and roof deck materials is usually completed within thirty minutes. In that time the exposed gelatinous film will imbibe enough atmospheric moisture to support the reaction after the membrane is assembled and air cannot reach the partially reacted polymer film. The reaction of the secondary silyl-terminated polymer will continue for several hours until a stronger elastomeric polyether film is formed.

As the secondary reaction becomes completed a third reaction begins. This third reaction involves difunctional or other polyfunctional silanes which become hydrolyzed by residual water from the previous reactions. The difunctional or other polyfunctional silanes act as adhesion promoters that react with corresponding moieties in the rubber membrane and deck material forming a covalent bond with the substrate and the internal polymer system in the adhesive. This reaction occurs over a longer period of time, usually ending in seven days.

Lastly, as the roof is exposed to increased temperatures and time, the phenolic resin will condense and form an even tighter knit bond with enhanced adhesion to the EPDM membrane. This exposure to time and temperature can increase the strength of the bonds by as much as a factor of 3.

The nature of the resulting elastomeric bond is thermosetting, or room temperature vulcanizing (RTV). Such chemical bonds are heat resistant and irreversible. This is an important attribute, since the most destructive force in flat roofing environments is heat.

Use of the improved single-sided adhesive rather than a two-sided adhesive can reduce labor costs. Another significant economic saving is related to the very high solvent content (80%) of solvent-based adhesives. Solvent-based products currently cost about $14 per gallon and form 50 square feet of bond per packaged pail. Installed material cost is currently about $28 per square (100 square feet). A 100% solids adhesive (i.e., one that completely solidifies—after application) would form at least 150 square feet of bond area per gallon. Thus, at $30 per gallon the thermosetting adhesive would currently cost only about $20 per square (100 feet of membrane). Therefore, solvent-based adhesives require three times the packaging, and three times the freight costs of a 100% solids adhesive. Additionally solvent-based adhesives require the roofers to spend more time and energy transporting the additional materials up to the roofs.

FIG. 1 shows an application in which an adhesive composition 16 in accordance with the invention is used for bonding rubber membrane sheets 12, 14 to a roof substrate 10 or deck. The same adhesive composition may be employed as an adhesive layer 18 for bonding overlapping edges of membranes 12 and 14 to form a lap-joint.

The phenolic resins used in the adhesive compositions of the invention are employed as a primary tackifying resin that provides tackiness between the adhesive material and the substrates that are to be bonded together. Representative examples of phenolic resins that may be employed in the compositions of this invention include resol-type and novolak-type phenolic resins obtained by condensation reaction of phenolic compounds, e.g., phenol, cresol, xylenol, resorcinol, an alkylphenol, and a modified phenol such as cashew nut shell oil modified phenol or tall oil modified phenol, with aldehyde compounds, e.g., formaldehyde and paraformaldehyde; and nitrogen-containing phenol resins obtained by condensation reaction of the above-mentioned phenolic compounds and aldehyde compounds in the presence of a catalyst such as ammonia or an amine compound. The phenol resins may be employed alone or in admixture. The phenol resin or combination of phenol resins is typically employed in an amount of from about 5% by weight to about 30% by weight of the total weight of the adhesive composition.

The term "silicon-containing hydrolyzable terminal group" as used herein means a group wherein at least one silicon atom is combined with a hydrolyzable group such as a methoxy group which is subject to hydrolysis and polymerization by moisture.

The backbone of the polymer having silicon-containing hydrolyzable terminal groups may be comprised of polyethers, polyesters, polyurethanes (SPUR), or other suitable backbones.

Suitable polymers having silicon-containing hydrolyzable terminal groups are commercially available and/or can be prepared in accordance with techniques known in the art. Examples of suitable commercially available polymers having silicon-containing hydrolyzable terminal groups are Geniosil® STP-E 35 trimethoxysilylpropyl-carbamate-terminated polyether, and Geniosil® STP-E 30 silane-terminated polyether with dimethoxy(methyl)silylmethylcarbamate terminal groups, both of which are available from Wacker Chemical. Another commercially available polymer having silicon-containing hydrolyzable terminal groups that may be employed in the adhesive compositions of this invention is "SPUR+" silane-terminated polyurethanes, available from General Electric. Another suitable commercially available material is "MS" silyl-terminated polyether (S227H), available from Kaneka.

The polymer or combination of polymers having silicon-containing hydrolyzable terminal groups is employed in the adhesive composition so that the ratio of the amount of polymer having silicon-containing hydrolyzable terminal groups by weight to the amount of phenolic resin by weight is greater than 2:1, more preferably greater than 3:1, and most preferably greater than 5:1.

In addition to the phenolic resin tackifying agent, an aliphatic and/or aromatic hydrocarbon resin may be employed as a supplemental tackifying agent in an amount up to about 30% by weight of the total weight of the adhesive composition, more preferably up to about 20%, and most preferably about 10% or less. An example of a suitable aromatic hydrocarbon resin is "A-100" $C_9$ hydrocarbon resin available from Revelli.

Preferably, a moisture scavenger is employed in the adhesive compositions of this invention. Moisture scavengers that may be employed include chemical moisture scavengers and physical moisture scavengers that absorb and/or adsorb moisture. A preferred chemical moisture scavenger is vinyl-trimethoxysilane, which may be employed in an amount of up to about 3% by weight based on the total weight of the adhesive composition. An example of a physical moisture scavenger that may be employed is 3A Sieves from UOP, which is a zeolite having 3 Angstrom pores capable of trapping moisture. Other moisture scavengers that may be employed include oxazoladines and calcium oxide.

The non-polymeric silicon-containing hydrocarbon compound can be generally any lower molecular weight silicon-containing compound having at least one hydrolyzable group capable of reacting with a hydrolyzed functional group on the polymer having silicon-containing hydrolyzable terminal groups and at least one moiety capable of interacting (i.e., promoting adhesion) with materials that are to be bonded with one another (such as a rubber membrane material). The expression non-polymeric, as used to modify the silicon-containing hydrocarbon compound is meant to exclude polymers and copolymers having at least 10 repeat units or monomeric units, such as urethane prepolymers having silicon-containing hydrolyzable terminal groups, but is meant to encompass oligomeric silicon-containing hydrolyzable compounds having fewer than 10 repeat units or monomers, and which are useful for promoting adhesion between a substrate and a cured adhesive composition. Examples of suitable aminosilane adhesion promoters that may function as the non-polymeric silicon-containing hydrolyzable compound include, but are not limited to gamma-aminopropyltrimethoxysilane, gamma-aminopropyltriethoxysilane, gamma-(aminoethyl)-aminopropyltrimethoxysilane, methylaminopropyldimethoxysilane, methyl-gamma-(aminoethyl)-aminopropyldimethoxysilane, gamma-dimethylaminopropyltrimethoxysilane, and the like. Adhesion promoters may be employed in an amount from about 1% by weight to about 15% by weight based on the total of the adhesive composition, and more preferably from about 2% to about 5%.

The adhesive compositions of this invention may include a catalyst for promoting hydrolysis and condensation of organosilicon compounds (i.e., reactions between the terminal groups of the polymer having silicon-containing hydrolyzable terminal groups, and reactions between the optional adhesion promoter when present and the polymer having silicon-containing hydrolyzable terminal groups). Hydrolysis of organosilicon compounds may be catalyzed by either acids or bases. Useful basic catalysts that may be employed in the compositions of this invention include alkali metal hydroxides such as potassium hydroxide, silanolates such as lithium silanolate, organic amines, and Lewis bases such as alkali metal carbonates and bicarbonates. Suitable acid catalysts include mineral acids such as sulfuric and phosphoric acids, organic acids such as acetic, propanoic and methane sulfonic acids. Other suitable acid catalysts include Lewis acids such as aluminum chloride, organotin compounds such as dibutyl tin dilaurate and titanium compounds such as the alkyl ortho esters, including tetrabutyl titanate. Catalysts may be employed in an amount up to about 2% by weight based on the weight of the adhesive composition.

Examples of plasticizers that may optionally be employed in the adhesive compositions of this invention include propylene glycol dibenzoate, diisononyl phthalate, and soy methyl esters, Mesamol II, HB-40, butylbenzylphthalate. Plasticizers useful in the adhesive composition of this invention are high boiling solvents for the phenolic resin which preferably help with tackification, lowering of viscosity, and sprayability. Plasticizers when employed may be present in an amount up to about 40% by weight based on the total weight of the adhesive composition, with preferred amounts ranging from about 5 to about 30% by weight.

A suitable thixatrope that may be employed in the compositions of this invention is polyamide wax, such as "Crayvallac SLX" available from Crayvalley, or a polymerized castor oil such as Flowtone R also from Crayvalley. Thixatropes may be added in amounts up to about 5% by weight based on the total weight of the adhesive composition.

Generally, any compatible filler, such as calcium carbonate may be employed if desired for a particular application. However, fillers will generally be omitted when the adhesive composition is intended to be sprayed onto one surface that is subsequently applied to a second surface on which the adhesive is or is not deposited. Fillers may be employed in an amount up to about 50% by weight based on the total weight of the adhesive composition.

Antioxidants that may be employed if desired include hindered phenols and phosphate esters. These materials may be employed in amounts up to about 5% by weight based on the total weight of the adhesive composition.

The adhesive compositions of this invention may be formulated as either one-part or two-part compositions. In the case of one-part compositions, the composition is preferably free of water, and contains a moisture scavenger as discussed above. In the case of a two part composition that is combined at the point of use, one part may contain a small amount of water to initiate moisture curing and components that are not sensitive to moisture, whereas the other part may contain components that are sensitive to moisture such as adhesion promoters and more reactive polymers having silicon-containing hydrolyzable terminal groups.

The adhesive compositions of this invention when used to bond EPDM rubber sheet material to a high density particleboard have generally exhibited a peel strength of at least 2.5-4 pounds per linear inch (pli) after 30 day ambient cure. However, the thermosetting reactions in these compositions substantially improve with time and temperature. After 30 days curing at 150 degrees Fahrenheit (normal rooftop conditions) peel strengths as high as 7.8 pli were obtained.

Table 1 lists the ingredients and amounts for formulations A through F in accordance with the invention. Examples A through E are one-part compositions that cure upon contact with atmospheric moisture. Compounds A through D are all liquids with a viscosity of approximately 3500 centipoise. These compositions are intended for, but not limited to, use as horizontal grade adhesives for bonding rubber membranes (e.g., EPDM rubber membranes) to a roof deck (e.g., plywood, fiberboard, particleboard, gypsum board, expanded polystyrene, etc). Compound E is a trowel grade mastic with a viscosity of approximately 200,000 centipoise and is intended for, but not limited to, use as a vertical grade flashing adhesive for bonding rubber membrane materials to parapet walls and other vertical applications. Composition F is a two-part composition that reacts with both atmospheric moisture and moisture that is included in the system. The moisture in the system can be added separately or it can be intimately associated with any or all of the given raw materials, and can be taken advantage of by the absence of a moisture scavenger.

TABLE 1

|  |  | 1 Part Compounds | | | | | 2 Part | |
| --- | --- | --- | --- | --- | --- | --- | --- | --- |
|  | Manufacturer/Material | A | B | C | D | E | $F_1$ | $F_2$ |
| Polymer | Wacker/STP-E30 | 40 | 26 |  | 8 | 5 | 8 |  |
|  | Wacker/STP-E35 | 25 |  |  |  |  |  |  |
|  | Kaneka/S227H |  |  | 30 | 30 | 24 | 16 |  | 24 |
|  | GE/1015LM |  |  |  | 26 | 24 | 16 | 24 |
| Plasticizer | Velsicol/Benzoflex 50 | 8 |  |  |  |  |  |  |
|  | Exxon/DINP |  |  |  |  | 18 |  |  |
|  | Proctor & Gamble/SE-1885 |  | 29 | 28 | 28 |  | 6 | 21 |

TABLE 1-continued

|  | Manufacturer/Material | 1 Part Compounds | | | | | 2 Part | |
|---|---|---|---|---|---|---|---|---|
|  |  | A | B | C | D | E | $F_1$ | $F_2$ |
| Tackifier/Adhesion Promoter | Schenectady Int./SP-103 | 11 | 10 | 10 | 10 | 6 | 6 | 4 |
|  | Revelli/A-100 | 10 | | | | | | |
| Moisture Scavenger | GE/A-171 | 1 | 1 | 1.3 | 1.3 | 1 | 1.3 | |
|  | UOP/3A Sieves | | | | | | | |
| Adhesion Promoter | GE/A-1120 | 3 | 3.6 | 4.3 | 4.3 | 3 | 4.3 | |
| Catalyst | GE/Sul 11a | 0.5 | | | 0.4 | | 0.4 | |
|  | GE/DBTDL | | 0.4 | | | | | |
|  | Kaneka/U22OH | | | 0.4 | | | | |
| Filler | JM Huber/Q-3 | | | | | 32 | | |
| Thixatrope | Crayvalley/Crayvallac SLX | | | | | 3 | | |
| Antioxidant | Various/Antioxidant | 1.5 | | | | | | |
|  | Water/Water | | | | | | | 1 |
|  |  | 100 | 100 | 100 | 100 | 100 | 50 | 50 |
|  |  | | | | | | 100 | |

The above descriptions are considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An adhesive composition, comprising:
    a polymer having silicon-containing hydrolyzable terminal groups;
    a phenolic resin that is the condensation reaction product of a phenolic compound with an aldehyde compound; and
    a non-polymeric silicon-containing hydrolyzable compound;
    wherein the ratio of the amount of polymer having silicon-containing hydrolyzable terminal groups by weight to the amount of phenolic resin by weight is greater than 2:1, and wherein the composition has a viscosity less than 10,000 centipoise at room temperature, wherein the composition is substantially free of solids.

2. The adhesive composition of claim 1, that is substantially free of solids and has a viscosity of less than 5,000 centipoise.

3. The adhesive composition of claim 1, further comprising a plasticizer.

4. The adhesive composition of claim 1, further comprising a catalyst that promotes hydrolysis and condensation reactions that will cause the polymer having silicon-containing hydrolyzable terminal groups to react and form a cross-linked network upon exposure to moisture.

5. The adhesive composition of claim 1, wherein the phenolic resin is, or a combination of phenolic resins are, employed in an amount of from about 5% by weight to about 30% by weight of the total weight of the adhesive composition.

6. The adhesive composition of claim 1, wherein the hydrolyzable terminal groups of the polymer having silicon-containing hydrolyzable terminal groups are alkoxy groups.

7. The adhesive composition of claim 1, wherein the polymer having silicon-containing hydrolyzable terminal groups has a backbone comprised of polyether.

8. The adhesive composition of claim 1, wherein the polymer having silicon-containing hydrolyzable terminal groups has a backbone comprised of polyurethane.

9. The adhesive composition of claim 1, wherein the ratio of the amount of polymer having silicon-containing hydrolyzable terminal groups by weight to the amount of phenolic resin by weight is greater than 3:1.

10. The adhesive composition of claim 1, wherein the non-polymeric silicon-containing hydrolyzable compound is an aminosilane adhesion promoter.

11. The adhesive composition of claim 10, wherein the aminosilane adhesion promoter is selected from the group consisting of gamma-aminopropyltrimethoxysilane, gamma-aminopropyltriethoxysilane, gamma-(aminoethyp-aminopropyltrimethoxysilane, methylaminopropyldimethoxysilane, methyl-gamma-(aminoethyl)-aminopropyldimethoxysilane, and gamma-dimethylaminopropyltrimethoxysilane.

12. The adhesive composition of claim 10, wherein the aminosilane adhesion promoter is employed in an amount of from about 1% by weight to about 15% by weight based on the total weight of the adhesive composition.

13. The adhesive composition of claim 4, wherein the catalyst is employed in an amount up to about 2% by weight based on the weight of the adhesive composition.

14. The adhesive composition of claim 4, wherein the catalyst is an organotin compound.

15. The adhesive composition of claim 3, wherein the plasticizer is employed in an amount of from about 5% by weight to about 30% by weight based on the total weight of the adhesive composition.

16. The adhesive composition of claim 3, wherein the plasticizer is selected from propylene glycol dibenzoate, diisononyl phthalate, and soy methyl esters.

17. An adhesive composition comprising:
    at least two different polymers having silicon-containing hydrolyzable terminal groups, including a trimethoxysilylpropyl-carbamate-terminated polyether and a dimethoxy(methyl)silylmethylcarbamate-terminated polyether;
    a phenolic resin that is the condensation reaction product of a phenolic compound with an aldehyde compound; and
    a non-polymeric silicon-containing hydrolyzable compound;

wherein the ratio of the amount of polymer having silicon-containing hydrolyzable terminal groups by weight to the amount of phenolic resin by weight is greater than 2:1, and wherein the composition has a viscosity less than 10,000 centipoise at room temperature.

18. The adhesive composition of claim 1, wherein the polymer having silicon-containing hydrolyzable terminal groups is a silyl-terminated polyurethane.

19. The adhesive composition of claim 1, having at least two different polymers having silicon-containing hydrolyzable terminal groups, including a silyl-terminated polyurethane.

20. The adhesive composition of claim 1, wherein the polymer having silicon-containing hydrolyzable terminal groups is a silyl-terminated polyether.

21. The adhesive composition of claim 1, having at least two different polymers having silicon-containing hydrolyzable terminal groups, including a silyl-terminated polyurethane and a silyl-terminated polyether.

22. A method of adhering a surface of a first material to a surface of a second material, comprising:
applying to at least one of the surfaces a moisture-curable adhesive composition comprising a polymer having silicon-containing hydrolyzable terminal groups, a phenolic resin that is the condensation reaction product of a phenolic compound with an aldehyde compound, and a non-polymeric silicon-containing hydrolyzable compound, wherein the ratio of the amount of polymer having silicon-containing hydrolyzable terminal groups by weight to the amount of phenolic resin by weight is greater than 2:1, and wherein the composition has a viscosity less than 10,000 centipoise at room temperature, and wherein the composition is substantially free of solids;
contacting the surfaces; and
curing the adhesive composition.

23. A roof construction comprising:
a roof deck, and
a rubber membrane adhered to the roof deck with a cured product of an adhesive composition comprising a polymer having silicon-containing hydrolyzable terminal groups, a phenolic resin, and a non-polymeric silicon-containing hydrolyzable compound, wherein the ratio of the amount of polymer having silicon-containing hydrolyzable terminal groups by weight to the amount of phenolic resin by weight is greater than 2:1.

* * * * *

UNITED STATES PATENT AND TRADEMARK OFFICE
CERTIFICATE OF CORRECTION

PATENT NO. : 7,767,308 B2  Page 1 of 1
APPLICATION NO. : 11/581714
DATED : August 3, 2010
INVENTOR(S) : Georgeau et al.

It is certified that error appears in the above-identified patent and that said Letters Patent is hereby corrected as shown below:

On the Title Page, Item (75) Inventors: "Philip" should be -- Phillip --.

Col. 2, line 21, "thousands roofing" should be -- thousands of roofing --.

Col. 4, line 67, "organo-metalic" should be -- organo-metallic --.

Col. 5, lines 35 and 39, "per square (100" should be -- per square foot (100 --.

Col. 8, line 19, "two part" should be -- two-part --.

Col. 8, line 67, "Proctor & Gamble" should be -- Procter & Gamble --.

Col. 9, line 27, "drawings" should be -- drawing --.

Signed and Sealed this

Twenty-sixth Day of October, 2010

David J. Kappos
*Director of the United States Patent and Trademark Office*